United States Patent Office 2,750,329
Patented June 12, 1956

2,750,329

PLATINUM-CONTAINING REFORMING CATALYSTS

Wayne I. Barrett, Baltimore, Md., and Clifford S. Shipley, Aldan, Pa., assignors of one-half each to The Atlantic Refining Company, Philadelphia, Pa., a corporation of Pennsylvania, and W. R. Grace & Co., Norwalk, Conn., a corporation of Connecticut No Drawing. Application May 5, 1953,
Serial No. 353,228

11 Claims. (Cl. 196—50)

This invention relates to a reforming catalyst and to processes for producing and using such catalyst, and more particularly to a reforming catalyst comprising a cracking component impregnated with platinum or palladium.

Catalysts of this general type have been described heretofore in United States Patents Nos. 2,478,916, 2,550,531, and 2,589,189. The catalysts described in Patent No. 2,550,531 are characterized in particular by the deposition of one of the metals, platinum or palladium, upon a cracking component comprising silica and at least one metal oxide from the group consisting of alumina, zirconia, magnesia, and thoria, the catalytic activity of which has been modified or reduced to a range so as to make selective the finished reforming catalyst. One of the advantages of these catalysts is that they reduce to a minimum the production of gas and coke, and at the same time cause maximum isomerization to occur within the higher temperature range at which aromatic formation also occurs.

Platinum containing catalysts are costly and in order to justify their use economically must have a long life as compared with the life of lower-cost catalysts. "Catalyst life" as used herein means the number of barrels of feed stock processed per pound of catalyst at a given yield-octane level of the finished product.

It is also recognized that in order to derive the long life characteristic of a platinum-containing catalyst at the maximum yield-octane level, it is important that there be employed a method of depositing the platinum onto the cracking component base which is capable of producing uniformity throughout each catalyst batch and as between separately prepared batches.

It therefore is an object of this invention to produce catalysts having consistently long life characteristics, such that the requirements and economic advantages for long continuous operations may be fully realized.

It is a further object of this invention to provide a reforming catalyst in which the platinum or palladium, after deposition onto the catalyst base support, is converted to a particular state critical to uniform long life characteristics of the finished catalyst.

It is an additional object of this invention to provide methods for producing catalysts having consistently long life characteristics.

It has been found according to this invention that the life characteristics of reforming catalysts comprising a cracking component impregnated with platinum or palladium is a function of the association of the platinum or palladium with the cracking component.

The prior art, as exemplified by the aforementioned patents, has taught that a base material may be combined with platinum or palladium by a method involving three steps, namely, impregnation, drying, and reduction, and that the impregnation step may be accomplished very simply by admixing an aqueous solution of chloroplatinic acid or chloropalladic acid in the desired amounts and concentrations with the cracking component base material. Thereafter, the impregnated material is dried, and reduced with hydrogen at elevated temperatures, e. g., at about 1000° F.

In effect, the above mentioned prior art method of preparation is a simple occlusion or absorption process whereby the pores of the cracking component become filled with chloroplatinic acid solution, after which any supernatant liquid is drained off and the chloroplatinic acid in the occluded solution is deposited upon the cracking component by drying. The platinic compound is converted to metallic platinum by treatment under the described reducing conditions.

In following the impregnation and drying steps described in the prior art patents, it was found that the platinum prior to reduction could be removed readily from its base support by simple water washing. While this fact of itself is not significant, it was noted that catalysts prepared in this manner did not exhibit uniform life characteristics, with the result it was considered that probably there was failure of physical or chemical association between the deposited platinum and the base material.

Therefore, in accordance with the present invention, it will be shown that by using certain techniques of impregnation or drying or combinations thereof, as will be described in detail hereinafter, the platinum becomes associated with the cracking component base in such a manner that it cannot be removed from the base by water washing prior to the reduction step. These changes in procedure are especially significant since regardless of the preparation of the catalyst, whether by the prior art methods or the methods of the present invention, water washing has no effect on the platinum after reduction of the platinum to the metallic state.

With catalysts of this invention, the platinum is on the base material in a condition such that it cannot be removed by water washing prior to the reduction step, which property is a criterion of the condition of the platinum necessary for uniform, long life catalysts. For purposes of distinction, the platinum in this state or condition is termed "fixed" platinum. This term, "fixed" platinum, is used herein and in the appended claims to define that platinum deposited on the base material from an aqueous solution of a platinum compound in such a manner that it cannot be removed from the base material by water washing prior to the reduction step. This same definition of course applies to palladium.

While numerous theories might be advanced in an attempt to explain this surprising discovery of fixed platinum, it is believed sufficient to point out that since this platinum cannot be water-washed from the base prior to reduction, there is indicated a more intimate physical or chemical association with the base than is found when the platinum can be removed by water washing.

A phenomenon which has been observed when platinum is deposited on various cracking component bases according to one of the preferred methods to be described herein is the preferential removal of the platinum compound from the solution in contact with the base which results in a lowering of the concentration of the platinum compound in the solution below its original concentration. This preferential removal may be defined as "selective adsorption," as a consequence of which the platinum content of the final catalyst is always higher than would be obtained by mere occlusion of an equal volume of the original platinum-containing solution. In the latter case, the concentration of the platinum compound in the solution removed from the base is the same as its original concentration.

Selective adsorption would indicate that there is a more intimate physical or chemical association of the platinum with the base material than would result from mere occlusion of the impregnating solution, and therefore it might be concluded that selectively adsorbed platinum is equivalent to "fixed" platinum. However, it has been found in some instances that selectively adsorbed platinum may be washed from the base prior to reduction and that such catalysts do not have the superior life characteristics of the catalysts of the present invention.

Fixed platinum, therefore, includes something beyond selectively adsorbed platinum. This is demonstrated not only by the fact that fixed platinum cannot be washed from the base, but also by the far more important fact, as will be shown, that catalysts having more than the minimum required amount of fixed platinum demonstrate uniform long-life characteristics. It has been found, however, that by techniques which will be described, both occluded platinum and selectively adsorbed platinum, can be converted to fixed platinum to produce the improved catalysts of this invention.

The cracking component bases upon which the fixed platinum is incorporated, in accordance with this invention, include silica and at least one metal oxide from the group consisting of alumina, zirconia, magnesia, and thoria. In general, a cracking component having a catalytic activity in the range between 10 and 50 distillate-plus-loss as measured according to the method of Birkhimer, Macuga, and Leum, in "A bench scale test method for evaluating cracking catalysts," Proceedings of the American Petroleum Institute, Division of Refining, vol. 27 (III), page 90 (1947) is preferred, since it has been found that reforming catalysts produced from these modified cracking components produce superior results. Various other methods of measuring the catalytic activity of such catalyst bases have been described in the literature. A summary of the most widely used methods, including the Birkhimer et al. method, appears in "Catalytic cracking techniques in review," by Marshall Sittig, Petroleum Refiner, pages 274–275, vol. 31, No. 9 (1952). The Birkhimer et al. reference mentioned above gives a comparison of several methods. Therefore, if it is desired to compare the activity as described in terms of the Birkhimer et al. "$D+L$" with other activity measurements, it is only necessary to refer to the comparisons mentioned in such review.

According to the Birkhimer et al. $D+L$ (distillate-plus-loss) activity measurement method, it would be possible to have a theoretical maximum $D+L$ of 100. However, in general, for a fresh silica-alumina cracking catalyst the maximum $D+L$ will range between 90 and 95. Since the other catalytic activity measurement methods which employ a $D+L$ measure give much lower values for a fresh silica-alumina cracking catalyst, usually of the order of 45 to 65 depending upon the particular test, it is apparent that when one specifies a $D+L$ scale having practicable maximum activity of 90 to 95 the Birkhimer et al. test is being employed.

The aforementioned patent, U. S. P. No. 2,550,531, discloses various methods of modifying the activity of the base material, such as by heat treatment either with or without high pressure steam. Other methods may be used for modifying the catalytic activity of the base; for example, by varying the amount of the metal oxide combined with the silica, or incorporating a chemically combined alkali metal in the base.

In general, the method of making the catalysts of the present invention involves contacting the silica-metal oxide base with an aqueous solution of a soluble platinum compound, such as a chloroplatinic acid solution, under substantially non-evaporative conditions at moderately elevated temperatures for long periods of time. This may be accomplished in a number of ways, as will be set forth in greater detail hereinafter.

As a preliminary step, the water absorption capacity of the cracking component base is first determined by weighing a separate minor portion of the dried base, then completely covering this portion of the base with water and allowing the base to soak for ½ hour. Thereafter, the excess water is removed from the base by draining and centrifuging. The base is then weighed and the gain in weight is converted to milliliters of water retained per 100 grams of base.

An aqueous chloroplatinic acid solution is prepared with the concentration adjusted in such a manner that the desired amount of platinum (on the metal basis) to be put on the base is contained in that amount of water which will be absorbed by the base to be impregnated. For example, if it is found that a base will absorb 35 ml. of water per 100 grams of the base and it is desired to make a finished catalyst containing approximately 0.3% platinum by weight, a chloroplatinic acid solution would be prepared to contain 0.3 gram of platinum in each 35 ml. of solution.

According to one method of preparing the instant catalyst, which method will be referred to hereinafter as "high-humidity treating," the portion of the base remaining after determination of its water absorption capacity is impregnated by covering it with an excess of chloroplatinic acid solution of the desired platinum concentration. The solution is allowed to remain in contact with the base for about ½ hour, and thereafter the excess solution is removed by draining and centrifuging in the same manner as in the preliminary water absorption experiment. This procedure may be modified by spraying the required amount of chloroplatinic acid solution onto the base in incremental portions so that the uniform impregnation is accomplished without the necessity of employing the draining and centrifuging operation.

After this impregnation step, the material is placed in an oven for from 6 to 24 hours at a temperature of about 190° F. to 230° F. The important point in this operation is that free loss of moisture is avoided by the use of covers over the impregnated-base containers or a closed non-circulating oven. This is therefore a solution heat-treating step, that is, the impregnated base is treated under moderately elevated temperatures for long periods of time in the presence of chloroplatinic acid solution. However, it should be noted that some small reduction in the moisture content of the base may take place during this step.

Following the solution heat-treating step, the impregnated base is dried in a stream of hot gas, preferably nitrogen, at elevated temperatures, for example up to about 450° F. The dried impregnated base is then reduced in a hydrogen atmosphere at temperatures ranging from 350° F. to 1050° F.

The effect of the solution heat-treating step on platinum fixation is illustrated by the following two preparations, the first of which is a conventional preparation and the second a typical high humidity treatment preparation.

In the first preparation, a silica-alumina base having a catalytic activity of 42.3 $D+L$ (prepared by steam treating a fresh silica-alumina commercial cracking catalyst) was soaked for ½ hour in a solution of chloroplatinic acid and then centrifuged to remove excess solution. The impregnated, centrifuged base was tumble-dried rapidly in a stream of hot, dry nitrogen at a temperature of about 200° F. to 212° F., and thereafter further dried in nitrogen and reduced in hydrogen as described. This catalyst made to contain approximately 0.5 weight per cent total platinum, was found to contain only 0.07 weight per cent fixed platinum. This was determined by thoroughly water-washing an aliquot portion of the nitrogen dried base and analyzing the washed portion for platinum.

The second catalyst was prepared from the same base in a similar manner, except that the tumble-drying was replaced by the 24 hour high humidity treatment step. This catalyst showed a fixed platinum content of 0.40 weight per cent following the nitrogen drying step, the determination being made by washing an aliquot portion as in the experiment above.

According to a second solution heat-treatment method, the base is covered with an excess of chloroplatinic acid solution and is allowed to stand immersed for a relatively long period of time, the duration of such period depending upon the temperature and concentration of the impregnating solution. The use of higher temperatures or higher concentrations, or a combination of both, will permit a shorter soaking period. This method will be hereinafter referred to as the "heat-soak" method.

In preparing a catalyst according to this method, 300 grams of a silica-alumina base having a catalytic activity of 36 $D+L$ was covered with 250 ml. of a solution containing 1.31 grams of platinum as chloroplatinic acid. The jar containing this material was tightly closed and was held at 180° F. for 8 days. After cooling, the excess liquid was drained off and the impregnated material was washed 3 times with distilled water. The catalyst was then dried in a forced draft oven for 48 hours at 230° F., after which it was further dried at 450° F. in a stream of pure nitrogen. By analysis, the catalyst contained 0.37 weight per cent fixed platinum. The dried material was then reduced at 450° F. in a pure hydrogen stream.

A number of preparations were made according to this method to illustrate the relation of time, temperature, and initial concentration to the amount of fixed platinum in the finished catalyst. The results are shown in Table I, which follows.

Table I

| Preparation Number | Weight Percent Platinum in Impregnating Solution | Impregnation Time in Hours | Temp., °F. | Weight Percent Fixed Platinum Based on Weight of Finished Catalyst |
|---|---|---|---|---|
| 19 | 0.524 | 192 | 180 | 0.37 |
| 11 | 0.440 | 288 | 80 | 0.25 |
| 13 | 0.110 | 18 | 190 | 0.10 |
| 23 | 0.145 | 3 | 195 | 0.19 |
| 24 | 0.145 | 6 | 80 | 0.06 |
| 25 | 0.262 | 23 | 190 | 0.40 |
| 22 | 0.311 | 3 | 195 | 0.46 |

The data in Table I show that platinum may be fixed either by treatment at atmospheric temperatures for very long time, or at moderately high temperatures with relatively short treatment times. In general, therefore, the temperature may range from atmospheric to approximately the boiling point of the solution, however, preferred conditions are treatment times of from 16 to 48 hours at temperatures ranging from 190° F. to 210° F. at atmospheric pressures.

The results obtained by life testing a number of platinum-containing catalysts, some of which were prepared by the conventional method, some by the heat soak method, and some by high humidity treatment method demonstrate the uniform long life characteristics of fixed platinum catalysts of the instant invention as compared with non-fixed platinum catalysts of the prior art.

In Table II which follows, each catalyst with its mode of preparation, the activity of the silica-alumina base (steam modified silica-alumina commercial cracking catalyst), the total amount of platinum, and the percentage of fixed platinum is set forth.

Table II

| Catalyst Number | Method of Making | Activity of Base in D+L | Amount of Platinum | |
|---|---|---|---|---|
| | | | Total (In Weight percent) | Fixed (Weight percent of Total) |
| 13 | Heat-soak | 34.6 | 0.12 | 100.0 |
| 1 | Conventional | 39.4 | 0.26 | 8.0 |
| 8 | do | 42.9 | 0.25 | 8.0 |
| 4 | High Humidity Treatment | 39.4 | 0.21 | 100.0 |
| 10 | Heat-soak | 34.6 | 0.25 | 100.0 |
| 11 | do | 34.6 | 0.25 | 100.0 |
| 2 | Conventional | 39.4 | 0.3 | 3.3 |
| 21 | High Humidity Treatment | 38.1 | 0.39 | 90.0 |
| 19 | Heat-soak | 34.6 | 0.37 | 100.0 |
| 6 | Conventional | 42.3 | 0.42 | 16.7 |
| 5 | do | 39.4 | 0.45 | 4.4 |
| 7 | do | 37.4 | 0.48 | 20.9 |
| 3 | High Humidity Treatment | 39.4 | 0.40 | 100.0 |
| 14 | Heat-soak | 35.2 | 0.40 | 100.0 |
| 12 | do | 38.4 | 0.45 | 100.0 |
| 17 | Conventional | 34.6 | 0.323 | 16.1 |
| 16 | do | 34.6 | 0.710 | 7.0 |
| 15 | Heat-soak | 34.6 | 0.840 | 100.0 |
| 18 | do | 34.6 | 0.624 | 100.0 |
| 20 | do | 34.6 | 0.105 | 100.0 |

Each of the catalysts set forth in Table II was tested to determine its reforming life characteristics. Since it would be impractical to test every experimental catalyst in a full scale operation, a laboratory test was devised. This test was based on the fact that a commercially useful reforming catalyst must produce over a period of months a high yield of high octane product by promoting the reactions of isomerization of paraffins and dehydrogenation of naphthenes, instead of indiscriminate cracking.

Obviously, if a reforming catalyst produces only a low octane product even though it gives high yields and has a very long life, it is not commercially useful. Likewise, a catalyst may produce a very high octane product but at low yields for only a short time, i. e., its life is very short, in which case it would be of no use commercially. Consequently an evaluation of a catalyst must take all of these factors into consideration.

The ability of a reforming catalyst to continuously process feed stocks is dependent on operating under conditions of limited amounts of cracking, since conditions which impose large amounts of cracking tend to deactivate the catalyst through the mechanism of carbon deposition. The laboratory test procedure was established to operate at reformed product clear research octane number levels of from 90 to 92, which levels can be reached only by isomerization of paraffins and complete conversion of naphthenes to aromatics, unless a major proportion of the octane improvement is obtained by cracking. Catalysts which do not properly control the cracking reactions tend to deactivate at rather high rates so that under the fixed operating conditions imposed, the octane level of the reformed product will decrease even over the relatively short time interval encompassed by the laboratory test.

In the laboratory test a portion of the catalyst was contained in a fixed bed in the form of discrete pellets or granules and an East Texas distillate having the following properties:

ASTM distillation:
    Overpoint _____ ° F__ 180
    50 per cent_____ ° F__ 250
    Endpoint _____ ° F__ 365
Clear Octane Number (ASTM Method D908–51)_ 55
API gravity at 60° F_____ 56.5 was passed thereover under the following conditions:

Inlet temperature to the catalyst bed and outlet temperature from the catalyst bed was maintained at 875° F. for 24 hours, and then raised to 940° F. for the remainder of the test; hourly liquid space velocity of 3; pressure of 500 pounds per square inch; hydrogen to hydrocarbon mol ratio was 10 to 1. Samples of product were taken at regular time intervals during the run, and their octane numbers determined. The difference in octane number of the product after the catalysts had been on stream for 72 hours and after 200 hours at a constant average catalyst bed temperature is designated as a measure of the catalyst stability.

The laboratory stability numbers were related to actual catalyst life by tests in a large scale unit employing representative types of catalysts. For example, two catalysts were prepared, one to have 100 per cent of its platinum in a fixed condition, the other to have less than 5 per cent of its platinum fixed. The first catalyst had a laboratory stability number of approximately 2.2 and when tested on a pilot plant scale unit, processed 40 barrels of charge per pound of catalyst before the activity became low enough to require replacement. The second catalyst, however, had a laboratory stability number of 4.7 and when tested in the large scale pilot unit required replacement after processing only 2 barrels of charge per pound of catalyst.

In Table III which follows, the results of the stability measurements made in accordance with the above procedure on the catalysts of Table II are set forth. For convenience, the non-fixed platinum catalysts and the fixed platinum catalysts are divided into levels of total platinum concentration on the catalysts.

*Table III*

| Weight Percent Platinum in Catalyst | Non-Fixed Platinum Catalysts | | Fixed Platinum Catalysts | |
|---|---|---|---|---|
| | Catalyst Number | Stability Number | Catalyst Number | Stability Number |
| 0.1 to 0.2 | | | 13 | 3.2 |
| | | | 20 | 2.9 |
| | | | Average | 3.1 |
| 0.2 to 0.3 | 1 | 11.9 | 4 | 4.0 |
| | 8 | 9.4 | 10 | 3.4 |
| | 9 | 3.4 | 11 | 0.6 |
| | Average | 8.2 | 21 | 2.7 |
| 0.3 to 0.4 | 2 | 3.7 | 21 | 2.8 |
| | 17 | 2.4 | 19 | 1.6 |
| | Average | 3.1 | Average | 2.2 |
| 0.4 to 0.5 | 6 | 2.6 | 3 | 2.6 |
| | 5 | 2.5 | 14 | 1.1 |
| | 7 | 2.6 | 12 | 1.9 |
| | Average | 2.6 | Average | 1.9 |
| 0.5 to 1.0 | 16 | 3.1 | 15 | 1.2 |
| | | | 18 | 2.2 |
| | | | Average | 1.7 |

These data demonstrate that platinum on the catalyst must be in the fixed condition in order to insure uniform long life characteristics at all levels of platinum concentration. While it is preferred that all the platinum be fixed, it is not always possible to attain this end. In general, the catalysts having from about 50 per cent to 100 per cent of the platinum fixed are within the scope of this invention.

The total amount of platinum which may be deposited upon the cracking component bases mentioned heretofore may range between 0.1 per cent and 2.5 per cent by weight of the final catalyst. The catalysts of this invention may be used in reforming various hydrocarbon fractions, such as those produced by the Fischer-Tropsch synthesis process, high pressure hydrogenation of coal and similar bituminous substances, refining of oil shales and tar sands, and particularly petroleum distillate fractions, including naphthas, gasoline, kerosine, and higher boiling fractions. In particular, these catalysts are useful for refining hydrocarbon fractions boiling in the gasoline-kerosine range. The preferred reforming conditions range in temperature between 600° F. to 1000° F., in pressure between 100 to 1000 pounds per square inch, in hourly liquid space velocities from 0.1 to 10 in the presence of 1 to 20 mols of hydrogen per mol of hydrocarbon.

We claim:
1. A process for preparing a catalyst for reforming a hydrocarbon fraction boiling within the gasoline-kerosine range which comprises contacting a cracking component consisting essentially of silica and at least one metal oxide from the group consisting of alumina, zirconia, magnesia, and thoria, with an aqueous solution of a compound of a metal from the group consisting of platinum and palladium, the cracking component being characterized by having a catalytic activity within the range between 10 and 50 as compared with a theoretical maximum catalytic activity of 100 and a practicable maximum catalytic activity of between 90 and 95 on a distillate-plus-loss scale for the measurement of the catalytic activity of a cracking catalyst, the compound of the metal in the aqueous solution being in an amount such that upon contact of the cracking component with the aqueous solution between 0.1 per cent and 2.5 per cent of the metal by weight of the cracking component will be deposited on the cracking component, subjecting the cracking component and aqueous solution while maintaining substantially constant moisture content to a temperature for a time sufficient to effect fixation on the cracking component of at least 50 per cent of the metal deposited on the cracking component, drying the cracking component with the compound of the metal deposited thereon, and reducing the metal compound to the metal.

2. A process for preparing a catalyst for reforming a hydrocarbon fraction boiling within the gasoline-kerosine range, which comprises contacting a cracking component consisting essentially of silica and alumina with an aqueous solution of a compound of platinum, the cracking component being characterized by having a catalytic activity within the range between 10 and 50 as compared with a theoretical maximum catalytic activity of 100 and a practical maximum catalytic activity of between 90 and 95 on a distillate-plus-loss scale for the measurement of the catalytic activity of a cracking catalyst, the platinum compound in the aqueous solution being an amount such that upon contact of the cracking component with the aqueous solution between 0.1 per cent and 2.5 per cent of the platinum by weight of the cracking component will be deposited on the cracking component, subjecting the cracking component and aqueous solution while maintaining a substantially constant moisture content to a temperature ranging between atmospheric and the boiling point of the solution for a time sufficient to effect fixation on the cracking component of at least 50 per cent of the platinum deposited on the cracking component, drying the cracking component with the platinum compound deposited thereon and reducing the platinum compound to metallic platinum.

3. A process for preparing a catalyst for reforming a hydrocarbon fraction boiling within the gasoline-kerosine range, which comprises contacting a cracking component consisting essentially of silica and alumina with an excess of chloroplatinic acid, the cracking component being characterized by having a catalytic activity within the range between 10 and 50 as compared with a theoretical maximum catalytic activity of 100 and a practical maximum catalytic activity of between 90 and 95 on a distillate-plus-loss scale for the measurement of the catalytic activity of a cracking catalyst, the concentration of the chloroplatinic acid in the aqueous solution being such that upon contact of the cracking component with the aqueous solution between 0.1 per cent and 2.5 per cent of the platinum by weight of the cracking component will be deposited on the cracking component, separating the excess chloroplatinic acid solution from the cracking component, subjecting the cracking component and residual aqueous solution while maintaining a substantially constant moisture content to a temperature ranging between 190° F. and 230° F. for a time sufficient to effect fixation on the cracking component of at least 50 per cent of the platinum deposited on the cracking component, drying the cracking component with the platinum deposited thereon, and reducing the platinum compound to metallic platinum.

4. A process for preparing a catalyst for reforming a hydrocarbon fraction boiling within the gasoline-kerosine range, which comprises soaking a cracking component consisting essentially of silica and alumina in an aqueous solution of chloroplatinic acid, the cracking component being characterized by having a catalytic activity within the range between 10 and 50 as compared with a theoretical maximum catalytic activity of 100 and a practical maximum catalytic activity of between 90 and 95 on a distillate-plus-loss scale for the measurement of the catalytic activity of a cracking catalyst, the concentration of the chloroplatinic acid in the aqueous solution being such that upon contact of the cracking component with the aqueous solution between 0.1 per cent and 2.5 per cent of the platinum by weight of the cracking component will be deposited on the cracking component, soaking the cracking component in the aqueous chloroplatinic acid solution while maintaining a substantially constant moisture content at a temperature ranging between atmospheric and the boiling point of the solution for a time sufficient to effect fixation on the cracking component of at least 50 per cent of the platinum deposited on the cracking component, separating the chloroplatinic acid solution from the impregnated cracking component, drying the cracking component with the platinum deposited thereon, and reducing the platinum compound to metallic platinum.

5. A gasoline reforming catalyst of improved life characteristics consisting essentially of a cracking component comprising as the essential oxides in major proportion silica and at least one metal oxide from the group consisting of alumina, zirconia, magnesia, and thoria, said cracking component being characterized by having a cracking activity within a range between 10 and 50 as compared with a theoretical maximum activity of 100 and a practicable maximum activity of between 90 and 95 on a distillate-plus-loss scale for the measurement of the activity of a cracking catalyst, and a metal from the group consisting of platinum and palladium in amount equal to 0.1 per cent to 2.5 per cent by weight of the cracking component deposited thereon by impregnation with an aqueous solution of a compound of said metal while maintaining a substantially constant moisture content at a temperature ranging between 190° F. and the boiling point of said solution for a period of 3 to 48 hours.

6. A process for preparing a gasoline reforming catalyst of improved life characteristics which comprises contacting a cracking component consisting essentially of silica and at least one metal oxide from the group consisting of alumina, zirconia, magnesia, and thoria, said cracking component being characterized by having a catalytic activity within the range between 10 and 50 as compared with a theoretical maximum activity of 100 and a practicable maximum activity between 90 and 95 on a distillate-plus-loss scale for the measurement of the activity of a cracking catalyst, with an aqueous solution of chloroplatinic acid in amount sufficient to form a final catalyst containing between 0.1 per cent and 2.5 per cent platinum by weight of the cracking component while maintaining a substantially constant moisture content at a temperature ranging between 190° F. and the boiling point of sa solution for a period of 3 to 48 hours, drying the thus in pregnated cracking component and reducing the platinu compound on said cracking component to metalli platinum.

7. A process for preparing a gasoline reforming cataly: of improved life characteristics which comprises contacing a cracking component consisting essentially of silic and at least one metal oxide from the group consisting o alumina, zirconia, magnesia, and thoria, said crackin component being characterized by having a catalytic activity within the range between 10 and 50 as comparec with a theoretical maximum activity of 100 and a practicable maximum activity between 90 and 95 on a distillate-plus-loss scale for the measurement of the activity of a cracking catalyst, with an aqueous solution of chloroplatinic acid in amount sufficient to form a final catalyst containing between 0.1 per cent and 2.5 per cent platinum by weight of the cracking component, separating the excess chloroplatinic acid solution from the cracking component, subjecting the cracking component and adsorbed platinum compound while maintaining a substantially constant moisture content to a temperature ranging between 190° F. and 230° F. for a period of 6 to 24 hours, drying the thus treated impregnated cracking component, and reducing the platinum compound on said cracking component to metallic platinum.

8. A gasoline reforming catalyst of improved life characteristics consisting essentially of a cracking component comprising as the essential oxides in major proportion silica and at least one metal oxide from the group consisting of alumina, zirconia, magnesia, and thoria, said cracking component being characterized by having a cracking activity within a range between 10 and 50 as compared with a theoretical maximum activity of 100 and a practicable maximum activity of between 90 and 95 on a distillate-plus-loss scale for the measurement of the activity of a cracking catalyst, and a metal from the group consisting of platinum and palladium in amount equal to 0.1 per cent to 2.5 per cent by weight of the cracking component deposited thereon by impregnation with an aqueous solution of a compound of said metal while maintaining substantially constant moisture content at a temperature and for a time sufficient to effect fixation of at least 50 per cent of the metal deposited on said cracking component.

9. The gasoline reforming catalyst of claim 8, wherein the cracking component comprises silica and alumina, and the metal is platinum.

10. The gasoline reforming catalyst of claim 5, wherein the cracking component comprises silica and alumina, and the metal is platinum.

11. A process for reforming a hydrocarbon fraction boiling within the gasoline-kerosine range to increase the anti-knock value thereof, which comprises subjecting said fraction to contact at reforming conditions in the presence of hydrogen with the catalyst of claim 8.

References Cited in the file of this patent

UNITED STATES PATENTS

| | | |
|---|---|---|
| 2,550,531 | Ciapetta | Apr. 24, 1951 |
| 2,611,736 | Haensel | Sept. 23, 1952 |
| 2,651,598 | Ciapetta | Sept. 8, 1953 |